United States Patent [19]

Dieme

[11] 4,259,922
[45] Apr. 7, 1981

[54] APPARATUS FOR PRODUCING LOCKING PATCHES ON MAGNETIC SCREWS

[75] Inventor: Hilmar K. Dieme, Westfield, N.J.

[73] Assignee: Amerace Corporation, New York, N.Y.

[21] Appl. No.: 827,695

[22] Filed: Aug. 25, 1977

Related U.S. Application Data

[62] Division of Ser. No. 695,199, Dec. 30, 1975, Pat. No. 4,082,058.

[51] Int. Cl.³ .................. B05B 13/00; B25B 11/00
[52] U.S. Cl. .................................... 118/500; 269/8
[58] Field of Search ............... 118/319, 620, 230, 500; 335/285; 198/690; 269/8; 414/744 C

[56] References Cited

U.S. PATENT DOCUMENTS

| | | | |
|---|---|---|---|
| 2,264,348 | 12/1941 | Weygant | 198/690 |
| 2,816,790 | 12/1957 | Johnson | 335/285 |
| 2,862,752 | 12/1958 | Heppner | 335/285 |
| 3,637,065 | 1/1972 | Ruscitti | 198/690 |
| 3,831,736 | 8/1974 | Barnes | 198/690 |
| 3,894,509 | 7/1975 | Duffy et al. | 118/317 |
| 3,941,242 | 3/1976 | Braden | 198/690 |
| 3,991,704 | 11/1976 | Hulstein et al. | 118/2 |
| 4,046,106 | 9/1977 | Bowman | 118/230 |

FOREIGN PATENT DOCUMENTS

954355  4/1964  United Kingdom .................. 269/8

Primary Examiner—Morris Kaplan
Attorney, Agent, or Firm—Richard A. Craig

[57] ABSTRACT

Apparatus for mass producing locking patches of thermoplastic material on threaded portions of magnetic elements, such as screws. The apparatus includes a rotating dial assembly comprising a plurality of similar, closely-spaced permanent magnets, extending radially outwardly from the support thereof and completely thermally isolated from one another and on all sides except at a gap provided on its outer face. The screws to be patched are delivered to the periphery of the dial assembly where they are magnetically held by the magnets and carried past a heating station and a station where a stream of powder of the thermoplastic material is directed against preselected portions of the threads of the heated screws and fused in place to form the desired patches bonded to the unmodified threads of the screws.

17 Claims, 7 Drawing Figures

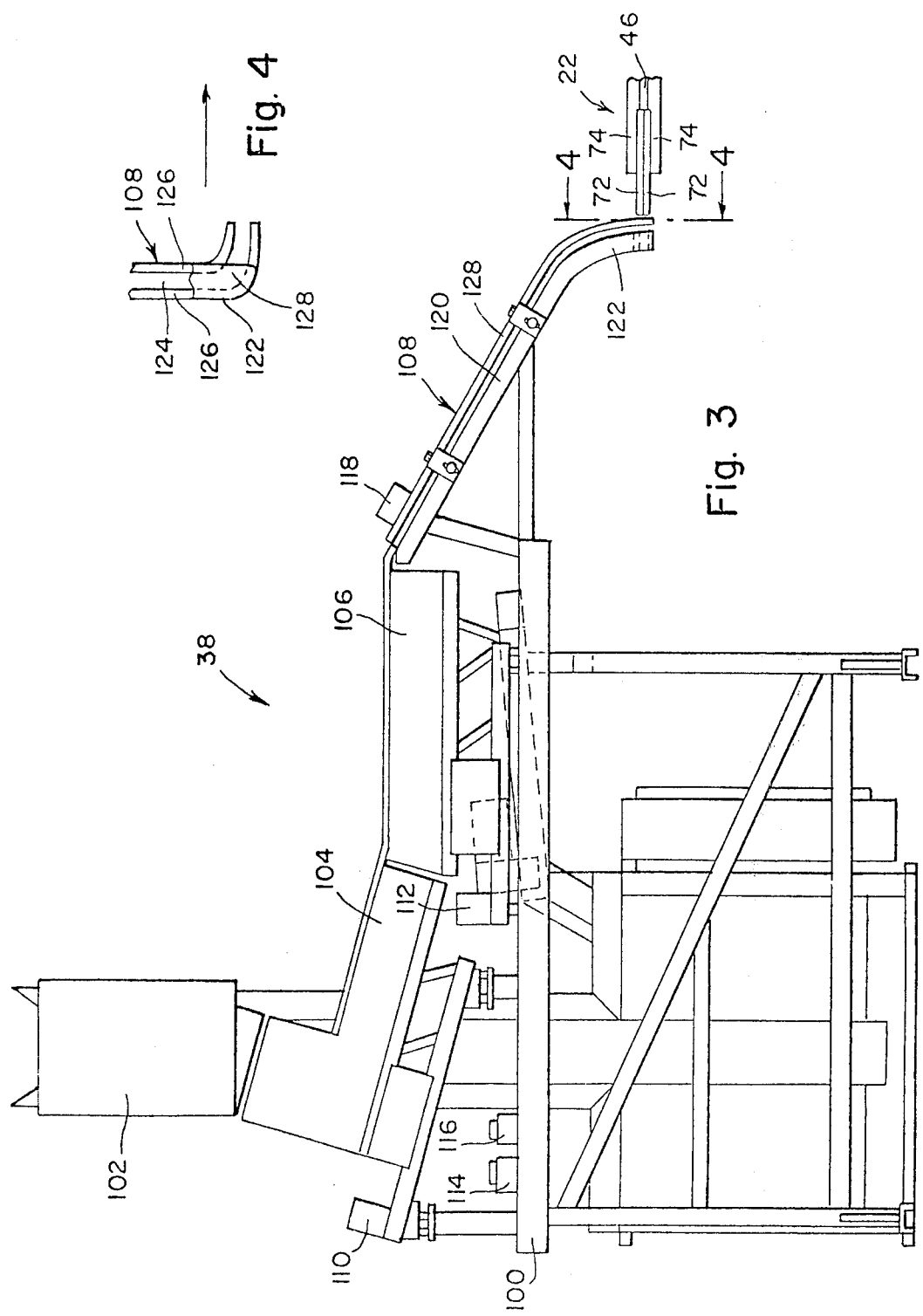

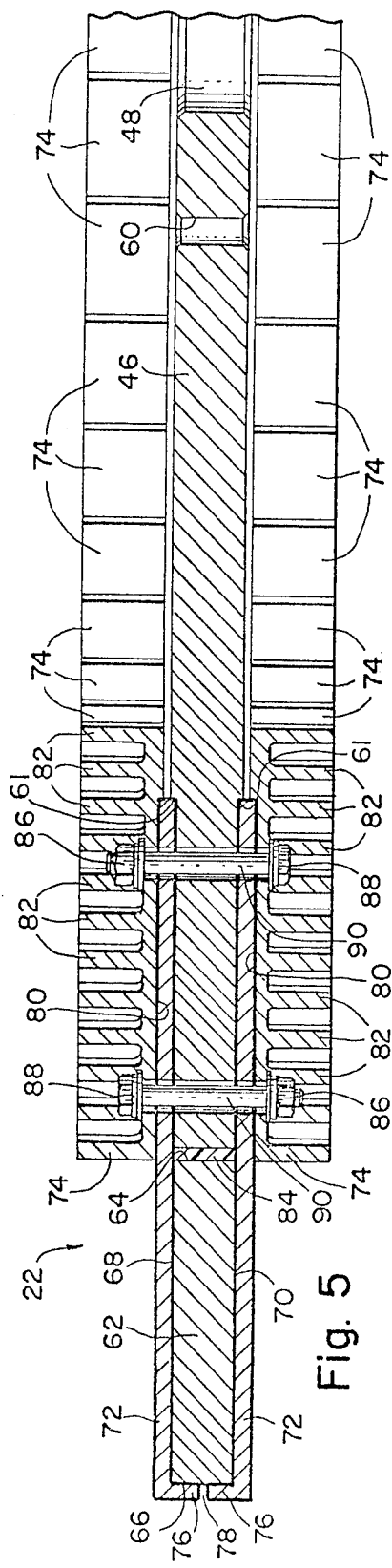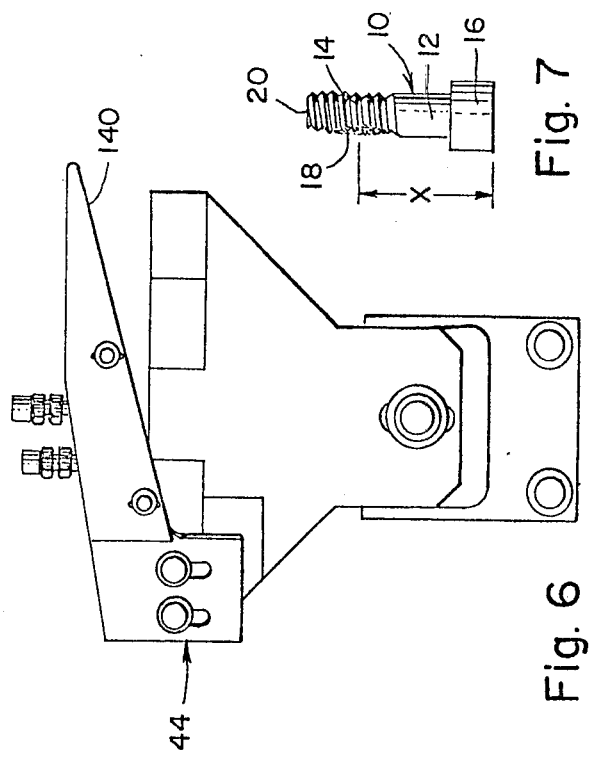
Fig. 5
Fig. 6
Fig. 7

APPARATUS FOR PRODUCING LOCKING PATCHES ON MAGNETIC SCREWS

This is a division of application Ser. No. 695,199, filed Dec. 30, 1975, now Pat. No. 4,082,058.

BACKGROUND OF THE INVENTION

This invention relates to an improved machine for mass producing locking patches of thermoplastic material on circumferentially and axially limited threaded portions of magnetic elements, such as screws, of the type disclosed in Barnes U.S. Pat. No. 3,831,736.

Barnes U.S. Pat. No. 3,831,736 also discloses a machine for mass producing locking patches on magnetic screws, in which machine such screws are placed on closely-spaced magnetic fixtures mounted on an endless belt which carries the screws in succession, with the screw axes horizontal, past a heating station and thence past a powder applying station where the heated screws pass through a freely falling stream of powder of the thermoplastic material. The powder melts upon striking the heated screws and on cooling solidifies, to produce patches bonded to the screw threads. The machine disclosed in the aforesaid Barnes patent is subject to the disadvantage that it is quite difficult, time-consuming and expensive to change-over from patching one type of screw to another, in that the entire belt must be replaced.

Burke et al U.S. Pat. No. 3,452,714 discloses apparatus for producing locking patches on headed screws, in which the screws are transported with their axes vertical, suspended by their heads between two parallel belts. Thus suspended, the screws are transported past a heating station and a powder applying station where powder is blown in a horizontal stream against the threads of the heated screws. The machine disclosed in the aforesaid Burke at al. patent is subject to the disadvantage that it is incapable of handling headless screws, such as set screws.

Burke U.S. Pat. No. 3,530,827 discloses a so-called "pinwheel" machine for patching headless screws such as set screws, but the output of the machine is limited by the fact that the screws must be hand fed to the machine.

There is also a prior art machine for producing locking patches on magnetic screws, this machine comprising a magnetic dial which is of one-piece monolithic construction. As in the machine of the present invention, the screws are held magnetically on the periphery of the dial which is rotated about its axis to carry the screws past a heating station and a powder applying station. However, it has been found in the operation of that prior art magnetic dial machine that if the dial is rotated with sufficient speed to achieve economical production rates, the capacity of the heater must be so great that excessive heat builds up in the dial itself, with the result that the dial loses its magnetism and the main bearings of the machine very quickly become ruined, necessitating that the machine be shut down and rebuilt.

It is therefore an important object of the present invention to provide an improved magnetic dial machine which overcomes the aforementioned disadvantages of the prior art and particularly wherein heat dissipation is provided for, to make possible higher speed operation for long periods of time.

It is another important object of the present invention to provide a magnetic dial machine wherein, in the event of damage to or deterioration of a section of the dial assembly, ready replacement of the damaged dial section is possible.

SUMMARY OF THE INVENTION

In accordance with the invention, there is provided a machine for mass producing locking patches of thermoplastic material on axially and circumferentially limited portions of unmodified threaded portions of screws of magnetic material, which machine overcomes the disadvantages of the prior art, as outlined above.

In a preferred embodiment, a machine according to the present invention includes a dial assembly which rotates about a vertical axis. The dial assembly includes a central disc of non-magnetic material which is secured to a shaft which is rotated in a given direction about the axis, thus to rotate the disc. The dial assembly also includes a plurality of like, closely-spaced permanent magnets extending outwardly from the outer periphery of the central disc and in magnetic communication with the outer periphery of the dial assembly.

The machine further includes means for delivering screws to be patched to the outer periphery of the dial assembly at a first circumferential location with respect to the dial assembly. At this location the screws are picked up by the magnets and magnetically held against the outer periphery of the dial assembly to rotate therewith.

Next, as the dial assembly rotates, the screws are carried in succession past screw heating means where the screws are heated to a temperature above the melting temperature of the thermoplastic material, and then the so heated screws are carried in succession past powder dispensing means which provides a constantly flowing downwardly directed stream of powder of the thermoplastic material which impinges on the desired portion of the threads of the screws and melts on contact.

Finally, the machine includes stripper means for removing the screws from the dial assembly.

Upon cooling, the thermoplastic material on the screws solidifies to form the desired patches bonded to the screw threads.

DESCRIPTION OF THE DRAWING

The invention will be described with reference to the accompanying drawings in which:

FIG. 3 is a reduced elevational view of apparatus for delivering screws to the machine of FIG. 1, showing a fragment of the dial assembly of such machine;

FIG. 4 is a fragmentary view on line 4—4 of FIG. 3;

FIG. 5 is an enlarged partly fragmentary view taken on line 5—5 of FIG.1;

FIG. 6 is an enlarged view of the stripper means, taken on line 6—6 of FIG. 1; and FIG. 7 is an elevational view of a screw patched by the illustrated machine.

DESCRIPTION OF THE PREFERRED MACHINE

Figure 1:
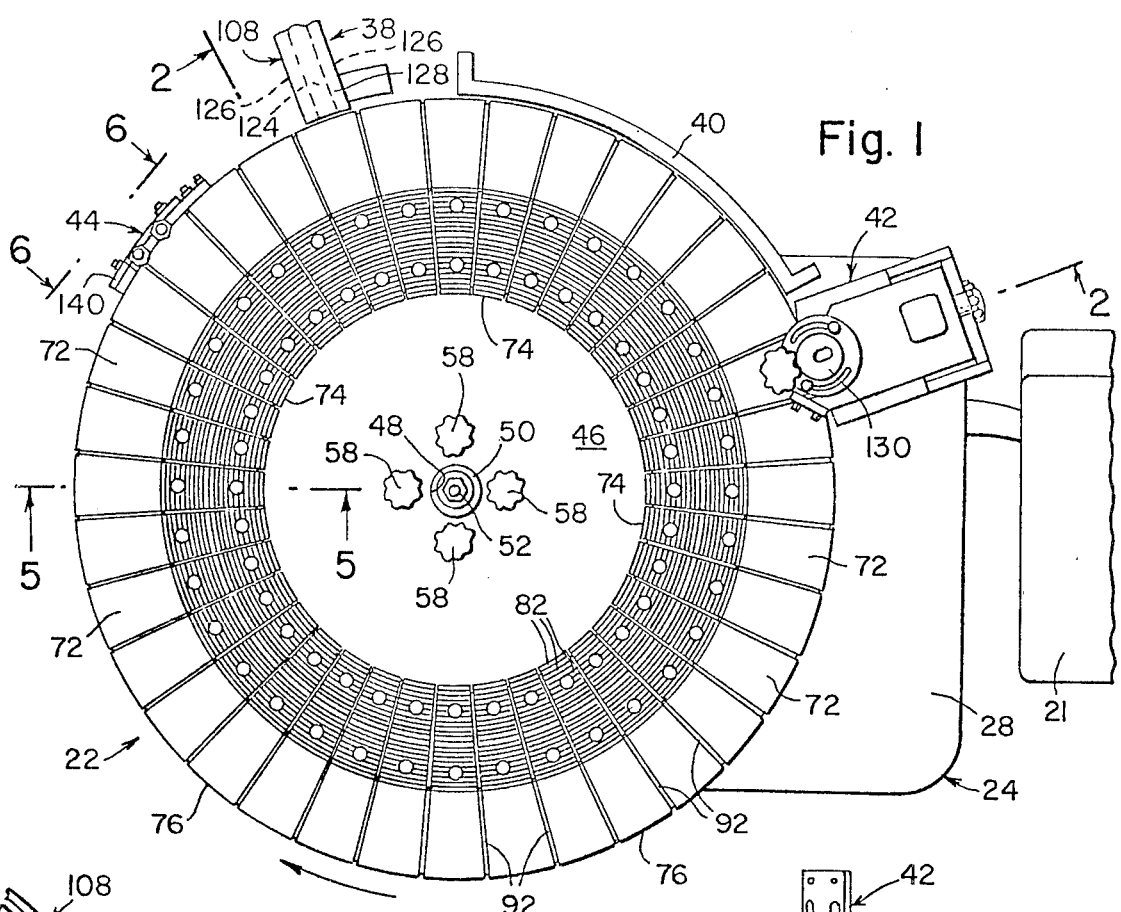
FIG. 1 is a plan view of a preferred machine embodying the invention.

FIG. 7 illustrates a plastic patch self-locking screw 10 comprising a screw 12 of magnetic material and having a shank provided with an external thread 14 of standard unmodified thread form and an enlarged head portion 16. A patch 18 of thermoplastic material is bonded to the thread surfaces of a plurality of convolutions of thread 14. Patch 18 covers a preselected area of the thread surface and is spaced at least one thread convolution from the work entering end 20 of the screw and extends arcuately of the screw thread through a desired angle, for example less than 180°, and merges gradually at its boundary edges into the thread surface of thread 14.

A preferred embodiment of machine for producing screws 10, in accordance with the present invention is illustrated in FIGS. 1 through 6.

Figure 2:
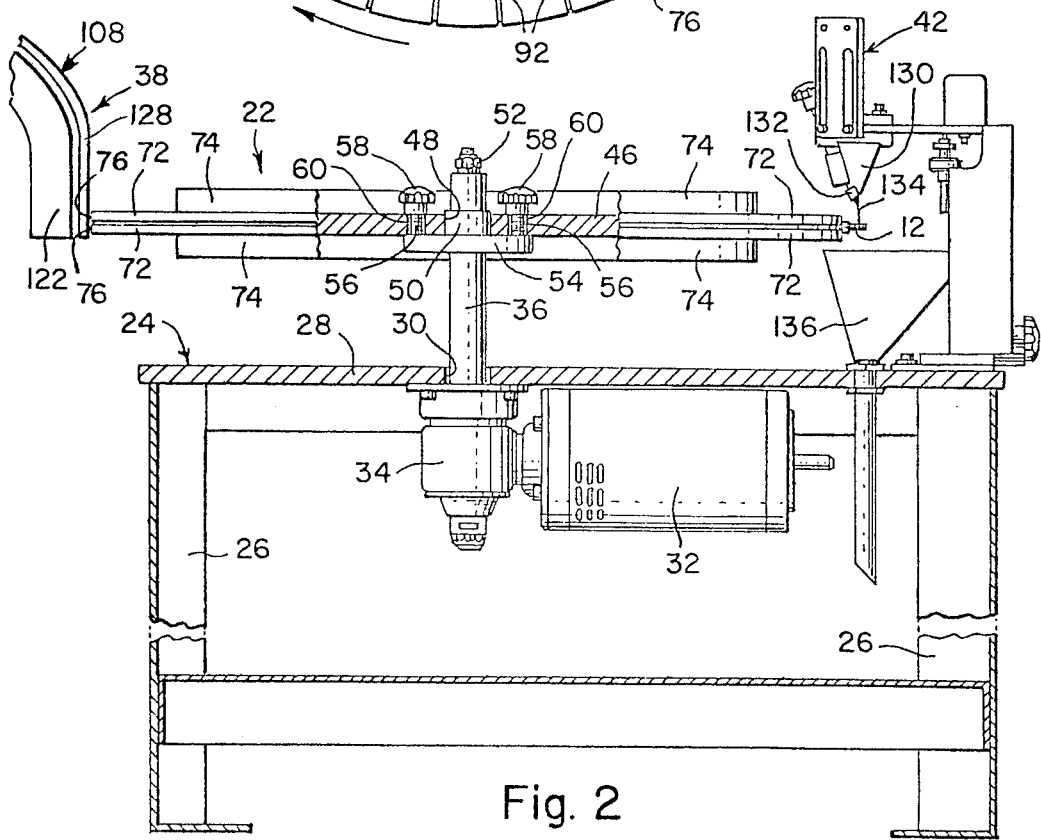
FIG. 2 is a view, partly in section and partly schematic, substantially on line 2—2 of FIG. 1.

Reference will first be made particularly to FIGS. 1 and 2. As shown in those views, the machine, which is controlled from a control panel 21, includes a dial assembly, indicated generally at 22, mounted on a table 24 having legs 26 and a horizontal top 28 having a hole 30 therethrough. An electric motor 32 and a speed reducer 34 are secured to the underside of table top 28, speed reducer 34 being directly beneath hole 30. A vertical shaft 36 is connected at its lower end to speed reducer 34 for rotation therewith and extends through hole 30 to project above table top 28. Dial assembly 22 is mounted on the upper end of shaft 35 in a manner outlined hereinafter.

Motor 32 and speed reducer 34 combine to rotate shaft 36 and dial assembly 22 in the direction indicated by the arrow in FIG. 1.

Spaced around the outer periphery of dial assembly 22 are: means, indicated generally at 38, for delivering unpatched screws 12 to the outer periphery of dial assembly 22; screw heating means in the form of an induction heater having a coil 40; powder dispensing means 42 providing a constantly flowing downwardly directed stream of powder of thermoplastic material; and screw stripper means 44. Screw delivering means 38, induction heater coil 40, powder dispensing means 42 and screw stripper means 44 are located at first, second, third and fourth circumferential locations, respectively, about dial assembly 22, proceeding thereabout in the direction of the arrow in FIG. 1.

DIAL ASSEMBLY 22

For details of dial assembly 22, and the mounting thereof, reference is made particularly to FIGS. 1, 2 and 5.

Dial assembly 22 includes a central disc 46 of non-magnetic material, such as aluminum. Central disc 46 has a central hole 48 therethrough. A hub 50 is suitably secured to the upper end of shaft 36 for rotation therewith, as by means of a key (not shown) and a nut 52. Hub 50 passes through central hole 48 and has an upwardly facing annular flange 54 on which central disc 46 rests and to which central disc 46 is secured by means of four screws 56 having fluted plastic knobs 58. Screws 56 pass through clearance holes 60 through central disc 46 and into tapped holes in hub flange 54. Thus central disc 46 is clamped between flange 54 and knobs 58 and central disc 46 rotates with hub 50 and hub 50 rotates with shaft 36. Central disc 46 is thicker at its center portion than at its outer portion, these portions being joined by cylindrical steps 61 on the upper and lower surfaces of central disc 46.

Extending outwardly from the outer periphery of central disc 46 and closely spaced therearound are a plurality of similar, closely-spaced permanent magnets 62 of ferro-magnetic sintered material. In the illustrated machine there are thirty six magnets 62, each of just slightly less than 10° circumferential extent. The sides of magnets 62 are radial with respect to central hole 48 and the thickness of each magnet 62 is the same as the axial thickness of central disc 46 at its outer periphery.

As will become more clearly apparent hereinafter, each magnet 62 is surrounded on all sides by heat-insulating material, with one exception noted below.

Each magnet 62 has an inwardly facing surface 64 confronting the outer periphery of central disc 46.

In the illustrated machine the diameter of the outer periphery of central disc 46 is about 27 inches, and the thickness of central disc 46 at its outer periphery is about ¾ inch. Surface 64 of each magnet 62 is rectangular and 2.334 inches long.

Each magnet 62 also has a rectangular outwardly facing surface 66 parallel to inwardly facing surface 64, the dimensions of outwardly facing surface 66 being ¾ inch by 2.97 inch. Further, surfaces 64 and 66 of each magnet 62 are spaced apart 3.63 inches from each other and each side surface of each magnet 62 tapers from outer surface 66 to inner surface 64, at an angle of 5° with respect to a plane perpendicular to surfaces 66 and 64.

Magnets 62 further have upper and lower parallel surfaces 68 and 70, respectively, which may be color coded so that all magnets 62 can readily be assembled with corresponding polarities.

Associated with each magnet 62 are a pair of like upper and lower segments 72 of non-magnetic, heat-conductive material such as electrical steel (4750)and a pair of like upper and lower sectors 74 of metallic, heat-conductive material, such as 7075-T6 aluminum, black anodized, except as noted hereinafter.

Thus, the illustrated machine includes seventy two sectors 74.

Each segment 72 is disposed generally radially outwardly with respect to central disc 46 and overlaps the outer periphery thereof, to overlie its associated magnet 62. Upper segment 72 overlies and covers upper surface 68 of magnet 62 and lower segment 72 overlies and covers lower surface 70 of magnet 62.

Each segment 72 is essentially plate-like and has at its outer end a flange 76 which overlies outer surface 66 of magnet 62. Flanges 76 of upper and lower segments 72 associated with each magnet 62 confront each other, leaving a small gap 78 therebetween, and provide the outer periphery of dial assembly 22, so that magnet 62 is in magnetic communication with that outer periphery through gap 78.

Each segment 72 has side surfaces which taper inwardly from flange 76 at an angle of 10° with respect to each other.

The outer diameter of dial assembly 22, as defined by flanges 76 of all segments 72, is about 35 inches.

Each segment 72 is coated on all surfaces with heat-insulating plastic material. Teflon has been successfully used for this purpose.

Each segment 72 also has two radially spaced mounting holes.

Upper sector 74 associated with each magnet 62 has a downwardly facing base surface 80 which lies on and covers the radially inward portion of associated upper segment 72; and lower sector 74 associated with the same magnet 62 has an upwardly facing base surface 80 which lies on and covers the radially inward portion of associated lower segment 72. The base surfaces of sectors 74 are not anodized, to facilitate heat transfer through those surfaces.

Each sector 74 has side surfaces which taper inwardly at an angle of 10° with respect to each other.

The exposed surface of each sector 74, opposite its base surface 80, is provided with arcuate heat radiating fins or baffles 82 extending between the side surfaces of sector 74. Fins 82 maximize the area of the exposed surface of sector 74, thus dissipating as much heat as possible to the atmosphere.

Each sector 74 also has two radially spaced mounting holes, spaced apart the same distance as the mounting holes of segments 72.

Prior to assembly of magnets 62, segments 72 and sectors 74 with central disc 46, a strip of heat-insulating Teflon tape 84 is applied to the outwardly facing outer periphery of central disc 46, completely around the circumference thereof.

The assembly with central disc 46 of one magnet 62 and its associated upper and lower segments 72 and its upper and lower segments 74 will now be described.

Magnet 62, properly oriented, is sandwiched between its associated upper and lower segments 72, with outer surface 66 of magnet 62 confronting and overlapped by segment flanges 76. The radially inward ends of upper and lower segments 72 are slid over the outer periphery of central disc 46 until the mounting holes of upper and lower segments 72 are aligned with a pair of mounting holes of central disc 46.

Upper sector 74 is placed with its base 80 engaging upper segment 72 and with the mounting holes of those two parts aligned with each other and with the pair of mounting holes through central disc 46 and lower sector 74 is placed with its base surface 80 engaging lower segment 72 and with the mounting holes of those two parts aligned with each other and with the pair of mounting holes through central disc 46. Alignment of the mounting holes is facilitated by steps 61.

The parts are then secured together by two brass nuts 86 and two brass bolts 88, the shank of one of which passes through each set of aligned mounting holes through central disc 46 and associated upper and lower segments 72 and upper and lower sectors 74.

The shank of each bolt 88 is provided with a heat shrunk tube 90 of heat-insulating material, a suitable example of which is FEP Teflon.

Upon assembly of magnets 62 and associated parts with central disc 46, a length of heat-insulating tape 92 is inserted between each pair of confronting side surfaces of adjacent magnets 62.

In result, each magnet 62 is surrounded by heat-insulating material on every surface, except that part of its outer surface 66 which is in registry with its associated gap 78 and is readily replaceable independently of each other magnet 62 and fins 82 of sectors provide for dissipation of heat to the atmosphere, instead of to central disc 46 and thence to shaft 36 and speed reducer 34.

Tubes 90 keep excessive heat from nuts 86 and bolts 88, thus avoiding the possibility that those parts might become seized and thus difficult to disassemble.

Magnets 62 are so closely spaced to one another as to present, in effect, a substantially circumferentially continuous magnetic holding surface for the screws being patched.

SCREW DELIVERING MEANS 38

Screw delivering means 38, which is principally shown in FIG. 3, includes a support stand 100 on which the components of means 38 are mounted.

Means 38 includes a hopper or storage feeder 102, a pre-orientor 104, a final orientor 106 and an adjustable track 108, together with a vibrating drive 110 for pre-orientor 104, a vibratory drive 112 for final orientor 106, a pre-orientor control 114 and a final orientor control 116. Means 38 also includes a bank level sensor 118.

In known fashion, pre-orientor 104 and final orientor 106 deliver unpatched screws 12 from an unoriented supply of screws 12 in hopper 102 to the upper end of adjustable track 108, which in turn delivers such screws 12 to the outer periphery of dial assembly 22.

The upper end of track 108 is located at a higher level than dial assembly 22. Track 108 has an upper section 120 which slopes downwardly at an angle of about 30° and a lower section 122 which is substantially vertical and which is smoothly joined to upper section 120.

More particularly, track 108 has a slot 124 which, in upper section 120 faces upwardly and in lower section 122 faces dial assembly 22. Slot 124 is provided by parallel rails 126 which support screws 12 by their head portions 16, with the screw shanks extending into a space between rails 126. Rails 126 are of non-magnetic stainless steel. The spacing between them is preferably adjustable and is set to accommodate the diameter of the shank of screw 12.

At its lowermost end, which is adjacent the outer periphery of dial assembly 22, track 108 bends at right angles, as shown in FIGS. 1 and 4, in the direction of rotation of dial assembly 22, indicated by the arrows in FIGS. 1 and 4.

Track 108 is also provided with a cover 128 to prevent screws 12 from prematurely leaving track 108. Cover 128 is of thin non-magnetic stainless steel. The spacing of cover 128 from rails 126 is preferably adjustable and is set to accommodate the axial dimension of head portion 16 of screw 12.

With dial assembly 22 rotating and with screws 12 being fed to the upper end of track 108 and proceeding from thence to the lower end of track 108, magnets 62 will magnetically pick up screws 12 one-by-one from the lowermost end of track 108, which screws 12 then rotate with dial assembly 22. One such screw 12 is shown in FIG. 2.

More particularly, screw delivering means 38 delivers a constant succession of screws 12 to dial assembly 22, so that screws 12 substantially fill the outer periphery of dial assembly 22 from delivering means 38, all the way around dial assembly 22 to stripper means 44.

Sensor 118 operates to stop the feeding of screws 12 into the upper end of track 108 when track 108 is completely filled with screws. A timer (not shown) then re-starts the screw feeding operation after a predetermined time interval.

SCREW HEATING MEANS

As aforesaid, the screw heating means includes an induction heater having a coil 40, located at a second circumferential location with respect to dial assembly 22. Coil 40 has parallel upper and lower parallel arms, of which only the upper arm is visible (FIG. 1). As dial assembly 22 carries screws 12 between those arms, screws 12 are heated to a temperature above the melting point of the thermoplastic material with which screws 12 are to be patched.

The faster dial assembly 2 is rotated, the more powerful the induction heater must be and the more heat dial assembly 22 is subjected to.

To achieve maximum production rates, it is desirable to rotate dial assembly 22 as fast as possible.

POWDER DISPENSING MEANS 42

Powder dispensing means 42 is mounted on table 24 and includes a funnel 130, located at a third circumferential location with respect to dial assembly 22.

The bottom (small) end 132 of funnel 130 is radially spaced outwardly from the outer periphery of dial assembly 22, a distance corresponding to the desired location of patch 18 which is to be produced on each screw 12, and is roughly the x-dimension indicated on FIG. 7.

Funnel 130 is filled with powder of the thermoplastic patch material, of which nylon 11 is a suitable example.

Powder dispensing means 42 provides a constantly flowing downwardly directed stream of powder of the thermoplastic patch material, as indicated at 134, which is traversed by the shanks of the heated screws 12, as the latter are carried in succession past powder dispensing means 42.

Thus, the powder impinges on the desired portion of the thread surfaces of each heated screw 12 and melts on contact. Upon cooling, the thermoplastic material on screws 12 solidifies to form the desired patches 18 bonded to the screw threads.

Excess powder may be caught and collected by a funnel 136.

SCREW STRIPPER MEANS 44

Finally, the machine includes screw stripper means 44 located at a fourth circumferential location about dial assembly 22.

Screw stripper means 44 is mounted on table 24 and includes a downwardly angled ramp 140 which brushes patched screws 10 from dial assembly 22.

For patching set screws, or other headless screws, suitable alternative known means can be employed, instead of screw delivering means 38.

A machine embodying the invention has been successfully used to patch screws at the rate of 600 per minute over long production runs and attains the hereinbefore stated objects and others.

The embodiments of the invention in which an exclusive property or privilege are claimed are defined as follows:

1. For use in a machine for producing locking patches of thermoplastic material on threaded portions of screws of magnetic material;
   a dial assembly comprising a central disc of non-magnetic material and a plurality of similar, closely-spaced permanent magnets mounted on and extending outwardly from said disc and in magnetic communication with the outer periphery of said dial assembly for magnetically holding said screws there-against;
   each said magnet located between upper and lower segments of non-magnetic material mounted on the upper and lower faces of said disc, respectively, said segments having confronting spaced-apart outer edges overlapping the outer extremity of the magnet which is therebetween, there being a gap between said confronting edges and said segments being coated with heat-insulating plastic material.

2. A dial assembly according to claim 1 wherein each said segment is of metallic material.

3. A dial assembly according to claim 2 wherein said heat-insulating plastic material is Teflon.

4. A dial assembly according to claim 1 wherein each said magnet is individually replaceable.

5. A dial assembly according to claim 1 wherein also associated with each said magnet are upper and lower sectors of metallic, heat-conductive material, such that said upper segment is between the upper face of said disc and said upper sector and said lower segment is between the lower face of said disc and said lower sector.

6. A dial assembly according to claim 5 wherein said sectors are provided with exposed, heat radiating fins.

7. A dial assembly according to claim 5 wherein each said magnet and its associated segments and sectors can be removed from said disc independently of every other said magnet.

8. A dial assembly according to claim 5 wherein each said magnet is surrounded on all sides by heat-insulating material, except that portion in registry with said gap.

9. A dial assembly according to claim 8 wherein said heat-insulating material is Teflon.

10. A dial assembly according to claim 8 wherein said heat-insulating material is Teflon tape.

11. In a machine for producing locking patches of thermoplastic material on threaded portions of screws of magnetic material:
    a dial assembly comprising a rigid central disc of non-magnetic material and a plurality of similar, closely-spaced magnets mounted on and disposed around the entire outer periphery of said disc and extending radially outwardly from said disc and in magnetic communication with the outer periphery of said dial assembly for magnetically holding said screws there-against, said magnets rigidly disposed with respect to said disc and each other, each said magnet being located between upper and lower segments of non-magnetic material mounted on the upper and lower faces of said disc, respectively, said segments having confronting spaced-apart outer edges overlapping the outer extremity of the magnet which is therebetween, there being a gap between said confronting edges and said segments being coated with heat-insulating plastic materials.

12. A dial assembly according to claim 11 wherein each said segment is of metallic material.

13. A dial assembly according to claim 11 wherein each said magnet is individually replaceable.

14. A dial assembly according to claim 11 wherein also associated with each said magnet are upper and lower sectors of metallic, heat-conductive material, such that said upper segment is between the upper face of said disc and said upper sector and said lower segment is between the lower face of said disc and said lower sector.

15. A dial assembly according to claim 14 whereing said sectors are provided with exposed, heat radiating fins.

16. A dial assembly according to claim 14 wherein each said magnet and its associated segments and sectors can be removed from said disc independently of every other said magnet.

17. A dial assembly according to claim 14 wherein each said magnet is surrounded on all sides by heat-insulating material, except that portion in registry with said gaps.

* * * * *

UNITED STATES PATENT AND TRADEMARK OFFICE
CERTIFICATE OF CORRECTION

PATENT NO. : 4259922
DATED : April 7, 1981
INVENTOR(S) : Dieme, Hilmar K.

It is certified that error appears in the above—identified patent and that said Letters Patent is hereby corrected as shown below:

Column 3, line 23, delete "35" and insert --36--

Column 6, line 66, delete "2" and insert --22--

Signed and Sealed this

Seventh Day of July 1981

[SEAL]

Attest:

RENE D. TEGTMEYER

*Attesting Officer*  *Acting Commissioner of Patents and Trademarks*